United States Patent Office 3,655,586
Patented Apr. 11, 1972

3,655,586
COPOLYMERS OF CYCLIC PHOSPHATES AND EPOXIDES OR ALDEHYDES
Edwin J. Vandenberg, Wilmington, Del., assignor to Hercules Incorporated, Wilmington, Del.
No Drawing. Continuation-in-part of application Ser. No. 690,433, Dec. 14, 1967. This application Feb. 13, 1970, Ser. No. 11,338
The portion of the term of the patent subsequent to July 21, 1987, has been disclaimed
Int. Cl. C08g 33/16, 37/36
U.S. Cl. 260—2 P                    10 Claims

ABSTRACT OF THE DISCLOSURE

Solid copolymers of cyclic phosphates such as alkylene alkyl phosphates and phenylene alkyl phosphates with epoxides such as epichlorohydrin or ethylene oxide or with aldehydes such as trioxane are provided.

---

This application is a continuation-in-part of my application, U.S. Ser. No. 690,433, filed Dec. 14, 1967, and now U.S. 3,520,849.

This invention relates to novel copolymers containing phosphorus, and more particularly to copolymers of cyclic phosphates and epoxides or aldehydes.

The phosphorus polymer of this invention is characterized by at least one recurring structural unit having the formula:

I 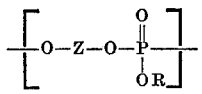

where R is selected from the group consisting of alkyl, cycloalkyl and aryl radicals and these radicals containing as substituents in any position alkyl, cycloalkyl, aryl, halo, haloalkyl, cyano, and cyanoalkyl radicals, and Z is selected from the group consisting of alkylene, cycloalkylene and arylene radicals. Examples of alkyl radicals include the methyl, ethyl, propyl, isopropyl, n-butyl, sec-butyl, tert.-butyl, hexadecyl, octadecyl, and the like radicals. Typical cycloalkyl radicals include the cyclopropyl, cyclobutyl, cyclopentyl, cyclohexyl, cyclooctyl and the like radicals. Examples of aryl radicals comprise phenyl, napthyl and the like. The halo radicals are the fluoro, chloro, bromo and iodo radicals. Examples of the haloalkyl radicals include the mono, di, tri, etc. (where applicable), fluoro-, chloro-, bromo-, and iodo-substituted methyl, ethyl, tert.-butyl, octadecyl, and the like radicals. The alkylene radicals encompass the methylene, ethylene, 1,3-propylene, 1,2-propylene, and the like radicals. Examples of cycloalkylene radicals include the cyclopropylene, cyclobutylene, cyclopentylene, cyclohexylene, and the like radicals. Representative arylene radicals comprise the phenylene, naphthalene and the like radicals. Typical cyanoalkyl radicals include the cyano substituted methyl, ethyl, tert-butyl, octadecyl and the like radicals.

The phosphorus copolymer of this invention is solid at 20-25° C. Some embodiments thereof at 20-25° C. are waxy, others are rubbery, while others are very hard. In general the polymer of this invention is thermoplastic, that is, it is thermally formable. A number of embodiments of the polymer of this invention have elastomeric properties. These elastomeric embodiments generally are easily cross-linked with metallic oxides (ZnO, MgO, CaO, and the like). This is especially true in the case of the embodiments comprising chloroethyl groups, which also are cross-linkable by reaction with diamines, 2-mercaptoimidazoline and other curing agents for polymers such as poly(epichlorohydrin) elastomers, and the like. The polymer of this invention is advantageously compounded with a filler, particularly reinforcing carbon blacks, silicas, clays, aluminas, and the like. Many of these rubbery, cross-linked embodiments have excellent dynamic properties, good low temperature behavior, excellent resistance to heat and light oxidation and to ozonation and, in a number of instances, good solvent resistance.

Some embodiments of the copolymer of this invention have flame resistance, in some instances being substantially self-extinguishing and in other instances being substantially non-burning.

The copolymers of this invention are, as stated above, solids, which can range from crystalline solids, to amorphous hard tough solids, to amorphous rubbers, to amorphorus or crystalline water-soluble products.

The phosphorus copolymer of this invention, whether crystalline or amorphous, has utility in general as an additive for lubricating oils and gasoline for stabilization and for improvement of flow and lubricant properties, and to synthetic resins, for example, polypropylene and the like, to increase oxidation and heat stability, and for improvement of impact strength.

The phosphorus-containing copolymer of this invention is made by contacting monomer material consisting essentially of at least one cyclic phosphorus monomer having the general formula:

II 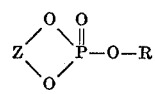

wherein R and Z have the same meanings as described above, and at least one epoxide or aldehyde, with a catalytic quantity of polymerization catalyst material therefor.

The cyclic phosphates having the foregoing general monomer Formula II comprise cyclic alkylene phosphates, cyclic cycloalkylene phosphates and cyclic arylene phosphates. Examples of these cyclic phosphates include, reference being made in each case to both formal and trivial (or common) names:

| | |
|---|---|
| 2-methoxy-2-oxo-1,3,2-dioxaphetane. | Methylene methyl phosphate. |
| 2-methoxy-2-oxo-1,3,2-dioxaphospholane. | Ethylene methyl phosphate. |
| 2-methoxy-4-methyl-2-oxo-1,3,2-dioxaphospholane. | 1,2-propylene methyl phosphate. |
| 2-ethoxy-2-oxo-1,3,2-dioxaphospholane. | Ethylene ethyl phosphate. |
| 2-ethoxy-4,5-dimethyl-2-oxo-1,3,2-dioxaphospholane | 2,3-butylene ethyl phosphate. |
| 2-ethoxy-5,5-bis(chloromethyl)-2-oxo-1,3,2-dioxaphosphane. | 2,2-bis(chloromethyl)-1,3-propylene ethyl phosphate. |
| 2-ethoxy-4-methyl-2-oxo-1,3,2-dioxaphospholane. | 1,2-propylene ethyl phosphate. |
| 2-(β-chloroethoxy)-4-methyl-2-oxo-1,3,2-dioxaphospholane. | 1,2-propylene β-chloro ethyl phosphate. |
| 2-ethoxy-2-oxo-1,3,2-dioxaphosphahexahydroindane. | 1,2-cyclohexylene ethyl phosphate. |
| 2-ethoxy-2-oxo-1,3,2-dioxaphosphaindane. | o-Phenylene ethyl phosphate. |
| 2-phenoxy-2-oxo-1,3,2-dioxaphospholane. | Ethylene phenyl phosphate. |
| 2-phenoxy-2-oxo-1,3,2-dioxaphosphaindane. | o-Phenylene phenyl phosphate. | and the like. The recurring structural unit derived from the cyclic phosphate will then have the foregoing Formula I.

The copolymers of this invention are prepared from a monomer material which, in addition to one or more cyclic phosphorus monomers, comprises one or more different copolymerizable monomers selected from epoxides and oxetanes. Typical copolymerizable monomers include epoxides such as oxiranes and oxetanes as for instance, oxiranes such as ethylene oxide, propylene oxide, the butene-2 oxides, epihalohydrins (for instance, epichlorohydrin and epibromohydrin) and the like, and oxetanes such as, for example, trimethylene oxide, 3,3-bis(chloromethyl)oxetane, and the like, and aldehydes and cyclized aldehydes such as, for instance, formaldehyde, paraformaldehyde, trioxane, acetaldehyde, propionaldehyde, paraldehyde, metaldehyde, chloral, β-cyanopropionalehyde, and the like.

The weight ratio of the cyclic phosphorus monomer portion of the monomer material to the copolymerizable monomer portion of the monomer material can vary widely. In general it is in a range from about 1:99 to about 99:1, but lower and higher operable weight ratios are within the broader concepts of this invention.

In addition, in some of the copolymer embodiments of this invention, the monomer portions are polymerized together all at once, in which case the polymer material obtained has a random polymer structure. In other copolymer embodiments the monomer portions are polymerized together sequentially, whereby the polymer material obtained has a block copolymer structure.

The phosphorus copolymer of this invention comprising a copolymer of a cyclic phosphate and an epoxide or aldehyde can contain any amount of the cyclic phosphorus monomer, i.e., units of Formula I, from 0.1 to 99.9% by weight. In general, however, it will contain an amount of the phosphorus units up to about 50%, preferably from about 0.2 to about 20% and more preferably from about 0.5 to about 10% by weight.

The copolymers of this invention are high molecular weight polymers, having a reduced specific viscosity (RSV) of at least about 0.1 as measured on a 0.1% solution of the copolymer in a suitable solvent at a suitable temperature. For instance, the RSV of a copolymer of a cyclic phosphate and a halogen-containing epoxide such as epichlorohydrin will preferably be measured on a solution in α-chloronaphthalene containing 3% acetylacetone at 100° C.; that of a copolymer of a cyclic phosphate and an alkylene oxide such as ethylene oxide will preferably be measured on a solution in chloroform at 25° C., and the RSV of a copolymer of a cyclic phosphate and trioxane will preferably be measured in dimethylformamide.

The polymerization catalyst material used in preparing the copolymers of this invention consists essentially of at least one compound that can effect polymerization of the monomer material. In some embodiments of this invention it comprises a mixture of two or more such compounds. Examples of such a compound or mixture of compounds include a wide variety of compounds and mixtures.

For instance, one general type of substance that appears to catalyze quite broadly the desired polymerization of the cyclic phosphorus-containing monomers of this invention is the reaction product of a halide-free organomagnesium compound and at least one polyreactive compound at an equivalent mole ratio generally in a range from about 0.02 to about 1.4, and preferably in a range from about 0.1 to about 1.2. The language "equivalent mole ratio" means the ratio of (1) the mathematical product of (a) the number of moles of polyreactive compound multiplied by (b) the number of reactive sites in the molecule of the polyreactive compound to (2) the mathematical product of (a) the number of moles of organomagnesium compound multiplied by (b) the sum of the magnesium to carbon bonds and magnesium to hydrogen bonds in the molecule of the organomagnesium compound. A preferred organomagnesium compound is one represented by a formula selected from the group consisting of $R_2''Mg$, $R''MgR'''$ and $MgR''''$, wherein $R''$ is any monovalent hydrocarbon radical such as, for example, alkyl, alkenyl, cycloalkyl, cycloalkenyl, aryl, alkaryl, cycloalkylaryl, and the like, $R'''$ is a monovalent radical selected from the group consisting of the H, $R''$, $OR''$, $NR_2''$, $SR''$, and the like radicals, and $R''''$ is a divalent polyunsaturated hydrocarbon radical, both valences of which are associated with the magnesium atom.

Examples of a halide-free organomagnesium compound used in the preparation of this polymerization catalyst comprise dimethylmagnesium, ethylmagnesium, diethylmagnesium, triethylmagnesium, dipropylmagnesium, diisopropylmagnesium, di-n-butylmagnesium, diisobutylmagnesium, di-(tert. butyl)-magnesium, diamylmagnesium, dioctylmagnesium, dicyclohexylmagnesium, diphenylmagnesium, ethylmagnesium hydride, butylmagnesium hydride, methoxy methylmagnesium, ethoxy ethylmagnesium, magnesacyclonona-3,7-diene and the like.

The polyreactive compound is any compound, organic or inorganic, having at least two sites in its molecule for reaction with the organomagnesium compound. Thus, any compound having in its molecule at least two groups or sites that react with organomagnesium compounds to form an O-mg, S-Mg, N-Mg, P-Mg, C-Mg, etc., bond can be used. Such polyreactive compounds comprise compounds containing at least two active hydrogens; compounds containing one active hydrogen and a member selected from the group consisting of oxygen doubly bonded to carbon (C=O), oxygen doubly bonded to nitrogen (N=O), oxygen doubly bonded to sulfur (S=O), oxygen doubly bonded to phosphorus (P=O), sulfur doubly bonded to carbon (C=S), sulfur doubly bonded to phosphorus (P=S), nitrogen doubly bonded to nitrogen (N=N), and nitrogen triply bonded to carbon (C≡N); compounds containing no active hydrogen, but having at least two members selected from the group consisting of C=O, N=O, S=O, P=O, C=S, P=S, C≡N, and N=S; and such polyreactive compounds as carbon monoxide and nitric oxide. As is well known, an active hydrogen is a hydrogen radical in a compound, organic or inorganic which is attached to a non-metallic element other than carbon, such as, for example, oxygen, sulfur, nitrogen, phosphorus, etc., and, therefore, is active. It also can be a hydrogen radical attached to carbon under conditions such that it is a so-called acidic hydrogen or a hydrogen activated by the presence of some activating group (an electron withdrawing group) in the molecule at a position alpha to the carbon to which the active hydrogen is attached, as for example, hydrogen that is bound to a carbon alpha to a C=O group, alpha to a —COOR group, alpha to a S=O group, alpha to an N=O group, and alpha to a C≡N group or the equivalent N≡C group, etc. Thus, the active hydrogen can be that present in one of the following groups: —OH, —SH, —NH₂, —NHR, —CONH₂, =CHNO, =CHNO₂, =N—OH, —SO₃H, —SO₂H, —O—SO₂H, —SO₂NH₂,, —CH—CO— =CH—C≡N, =CHSO₂—, —COOH, and the like.

Exemplary of active hydrogen compounds containing at least two active hydrogens, that can be used as polyreactive compounds for reaction with organomagnesium compounds to form these catalysts comprise water; alkylene glycols and cycloaliphatic polyols, such as, for example, ethylene glycol, trimethylene glycol, tetramethylene glycol, pentamethylene glycol, glycerol, pentaerythritol, trimethylol propane, 2-butene-1,4-diol, 2-butyne-1,4-diol, 1,3-cyclohexanediol, 1,4-cyclohexanediol, and the like; polyhydric phenols such as, for example, resorcinol, hydroquinone, pyrocatechol, bisphenol A (p,p'-isopropylidenediphenol), and the like; ammonia; amines including alkylamines such as, for example, methylamine, ethylamine, n-butylamine, amylamines, and the like, arylamines such as, for example, aniline and the like, aralkylamines such as, for example, benzylamine and the like, cycloalkylamines such as, for example, cyclohexylamine and the like, diamines such as, for example, ethylenediamine, diethylene triamine, triethylene tetramine, hexamethylenediamine, p-phenylenediamine, piperazine and the like; hydroxylamine; aminoalcohols such as, for example, ethanolamine, tetrakis-hydroxyethyl ethylenediamine, and the like; hydrazines such as, for example, hydrazine, phenyl hydrazine, and the like; amides such as, for example, urea, thiourea, acetamide, malonamide, and the like; sulfenamides and sulfonamides, such as, for example, p-toluene sulfonamide and the like; hydrogen sulfide; dimercaptans such as, for example, ethanedithiol, 1,5-pentanedithiol, dithioresorcinol, and the like; 2-mercaptoethylamine; dialkyl sulfides, dialkyl disulfides; dialkyl polysulfides; sulfones and hydroxysulfones, such as, for example, dibutylsulfone, hydroxyethyl methyl sulfone, and the like; sulfoxides such as, for example, dibutyl sulfoxide, dimethyl sulfoxide, and the like; acids such as sulfuric acid, sulfurous acid, phosphorus acid, phosphoric acid, carbonic acid, acetic acid, oxalic acid, phthalic acid, ethylendiamine tetraacetic acid, $\alpha,\alpha$-dioctyl ethylenediamine diacetic acid, malonic acid, succinic acic, adipic acid, and the like; ketones such as, for example, acetone, diacetyl, dibenzoylmethane, 2-hydroxyethyl methyl ketone, acetylacetone, acetonylacetone, diacetylacetone, acetophenone, and the like; esters such as, for example, malonic esters, for instance, methyl malonate, ethyl malonate, and the like, acetoacetic acid, ethyl acetoacetate, and the like; nitro and nitroso alkanes, such as, for example, nitromethane, nitroethane, nitrosomethane, and the like; nitriles and isocyanides, such as acetonitrile, hydracrylonitrile (3-hydroxypropionitrile), and the like; the hydrate of formaldehyde; $(HNS)_4$; and the like. Many other active hydrogen compounds wherein there are present in the molecule at least two active hydrogens can be used.

The quantity of polyreactive compound reacted with the organomagnesium compound depends on the polyreactive compound, the organomagnesium compound, etc., and to some extent upon the diluent, temperature, the monomer being polymerized, etc. In general it is such as to give an equivalent mole ratio in a general range from about 0.02 to about 1.4, in a preferred range from about 0.1 to about 1.2 and usually in a range from about 0.2 to about 0.8. Thus, in the case of a difunctional polyreactive compound such as water, one would use from about 0.02 to about 1.4 moles of water per mole of organomagnesium compound of the formula $R''R''Mg$ or of the formula $R''HMg$, and preferably from about 0.1 to about 1.2 moles of water per mole of said magnesium compound. If the polyreactive compound contains more than two reactive sites and the organomagnesium compound is of one of the specified formulas, the amount of the polyreactive compound is reduced proportionately.

Any desired procedure can be used for reacting the organomagnesium compound with the polyreactive compound. In one procedure the organomagnesium compound and the polyreactive compound are prereacted by adding the polyreactive compound to a solution or dispersion of the organomagnesium compound in a liquid having no adverse effect on this reaction and preferably on the polymerization reaction of this invention, including a liquid which forms a complex with the organomagnesium compound. Representative liquids having no such adverse effect are liquid hydrocarbons, examples of which include liquid aliphatic straight chain and branchd hydrocarbons such as n-hexane, n-heptane, and the like, liquid aromatic hydrocarbons such as benzene, toluene, and the like, liquid cycloaliphatic hydrocarbons such as hexane, methylcyclohexene, and the like, a liquid ether, examples of which include diethyl ether, diisopropyl ether, and the like, or a mixture of such liquids. These organomagnesium-polyreactive compound reaction products can be used immediately or aged, or if desired, heat-treated in some cases. In another procedure the reaction of the organomagnesium compound and the polyreactive compound is carried out by reacting the two reagents in situ in the polymerization reaction mixture. This can be accomplished by adding the polyreactive compound to the monomer material being polymerized and then adding the organomagnesium compound, or by adding the two reagents to the polymerization reaction mixture simultaneously.

Another general type of compound that catalyzes the desired polymerization of the monomer material of this invention is an organozinc product such as that obtained by the reaction of a dihydrocarbon zinc compound with a polyfunctional compound selected from the group consisting of water, nonaromatic polyols having at least one carbon between the COH or hydroxycarbyl groups, and polyhydric phenols, the mole ratio of the polyfunctional compound to the dihydrocarbon zinc compound being in a range from about 0.2 to about 1.2. The dihydrocarbon zinc compound is an organozinc compound having the formula $RZnR'$, wherein R and R' are hydrocarbon radicals that can be either alike or different. Exemplary of dihydrocarbon zinc compounds are dimethylzinc, methyl ethylzinc, diethylzinc, dipropylzinc, diisopropylzinc, di-n-butylzinc, diisobutylzinc, di-tert-butylzinc, diamylzinc, dioctylzinc, dicyclohexylzinc, dicyclopentadienyl zinc, diphenylzinc, and the like. Representative of the nonaromatic polyols wherein there is at least one carbon atom between the hydroxycarbyl groups include trimethylene glycol, tetramethylene glycol, pentamethylene glycol, 2-butene-1,4-diol, 2-butyne-1,4-diol, 1,3-cyclohexanediol, 1,4-cyclohexanediol, and the like. Exemplary of the polyhydric phenols are resorcinol, hydroquinone, catechol, and the like. The preferred mole ratio of polyfunctional compound to dihydrocarbon zinc compound is in a range from about 0.4 to about 1.

Another general type of compound that catalyzes the desired polymerization of the cyclic phosphate monomer material of this invention is the organoaluminum compound. Preferred examples of such a compound include organoaluminum-water reaction products such as disclosed in U.S. Pat. 3,135,705, to Vandenberg, the catalyst disclosures of which are incorporated herein by reference.

Still another general type of compound that catalyzes the desired polymerization of the cyclic phosphate monomer material of this invention, particularly for the copolymerization with trioxane, is a Lewis acid type catalyst such as boron trifluoride, boron trifluoride etherate, and the like.

Any quantity from a minor catalytic quantity up to a large excess can be used to catalyze the polymerization reaction in accordance with this invention, but, in general, it is within a range from about 0.2 to about 10 mole percent based on the monomer material being polymerized and preferably is within the range from about 1 to about 5 mole percent. The amount used depends in part on such factors as monomer purity, diluent or liquid reaction medium purity, etc., less pure monomer material and liquid reaction medium requiring more catalyst material to destroy reactive impurities.

The polymerization reaction is carried out in any desired way. It is performed on either a batch or a continuous basis with the catalyst material being added all at once or in increments during the polymerization, or continuously throughout the polymerization. If desired, the monomer material is added gradually to the polymerization reaction mass. It is carried out as a bulk polymerization process, in some cases at the boiling point of the monomer material (reduced or raised to a convenient level by adjusting the ambient pressure) so as to remove heat of reaction. It is also carried out in a fluid medium or diluent having no substantially adverse effect on the polymerization reaction. Any material inert under the polymerization reaction conditions and fluid under said conditions can be used. Preferably it is a liquid under said conditions and preferably the total polymer product or at least one polymer product formed in the polymerization reaction is substantially insoluble in it, while the mnomer material is substantially soluble in it. Preferred examples of such a fluid include the normally liquid dialkyl, aryl and cycloalkyl ethers such as, for instance, diethyl ether, dipropyl ether, diisopropyl ether, and the like, the normally liquid aromatic hydrocarbons such as, for instance, benzene, toluene, xylene, and the like, and the normally liquid saturated branched and unbranched aliphatic hydrocarbons and cycloaliphatic hydrocarbons, such as, for instance, n-heptane, cyclohexane, and the like. A mixture of such liquids can be used and in many cases is preferable. The polymerization reaction of this invention can also be carried out with additives such as, for example, antioxidants, carbon black, zinc stearate, some accelerators and other curatives, and the like, in the reaction mass.

The polymerization process can be carried out over wide temperature and ambient pressure ranges. In general, it is carried out in a temperature range from about −80 to about 150° C., preferably within a range from about −50 to about 120° C., and usually substantially in a range from about −30 to 100° C. In general, the polymerization reaction is conducted at atmospheric pressure, but superatmospheric pressure up to several hundred pounds, including autogenous ambient pressure, can be employed, if desired, and subatmospheric pressure can be employed, if desired.

The reaction time or period can vary, being dependent on such variables as purity of monomer material and of fluid reaction medium, quantity of fluid reaction medium and the like. Generally the quantity of fluid reaction medium is sufficient to establish and maintain the reaction mixture in a fluid condition substantially throughout the reaction period. Accordingly, the reaction period is generally in a range from about one minute to about a thousand hours, and preferably in a range from about 10 minutes to about 20 hours, although greater and lesser times are within the broader concepts of this invention.

The polymer product or products, as the case might be, is, or are, separated from the reaction mixture by conventional procedures, solvent precipitation being a particularly preferred procedure.

This invention is further illustrated by the following examples of various aspects of this invention, including preferred specific embodiments thereof. This invention is not limited to these embodiments. In these examples all parts and percentages are by weight except where the contrary is stated. The term "mole" as used herein means the quantity, expressed in parts, of the indicated substance numerically equal to the molecular weight of that substance. The term "ether," when employed alone in the examples, refers to diethyl ether. The reduced specific viscosity (RSV) values were determined with a conventional Ubbelohde viscometer on 0.1% solutions of the polymer products at the temperature specified in the specified solvent.

EXAMPLES 1 AND 2

These examples illustrate copolymer products of this invention made from cyclic phosphate monomer material and oxirane monomer material.

The monomer material employed in Example 1 was 5 parts of epichlorohydrin and 5 parts of 2-phenoxy-2-oxo-1,3,2-dioxaphospholane and that in Example 2 was 5 parts of ethylene oxide and 5 parts of 2-phenoxy-2-oxo-1,3,2-dioxaphospholane.

The polymerization catalyst material employed in each of these examples was triethyl Al·0.5H$_2$O·0.5-acetylacetone reaction product made as taught in U.S. Pat. 3,135,705 and as a 0.5 mole concentration in a 70:30 (weight ratio) of ether-heptane. In each case the quantity of catalyst used was 0.004 mole (triethyl Al basis).

In each of these examples, a batch polymerization reactor filled with nitrogen was charged with 79 parts of toluene and the two monomers. After equilibrating the vessel and contents at 30° C., the catalyst solution was injected into the vessel. The reaction mixture was then agitated for 19 hours at 30° C. The reaction was stopped by the addition of 4 parts of anhydrous ethanol. The copolymer product was then separated by adding a sufficient quantity of ether to completely precipitate the polymer (1–4 volumes), collecting the insoluble product, washing it twice with ether and once with a 0.1% solution of Santonox [4,4′-thiobis(6-tert.-butyl-m-cresol)] in ether and drying the product under vacuum for 6 hours at 20–25° C. in Example 1 and 80° C. in Example 2.

The copolymer produced in Example 1 was a white film having a crystalline X-ray pattern and an RSV of 3.0, as measured on a 0.1% solution in α-chloronaphthalene containing 3% acetylacetone at 100° C. Analysis of the copolymer showed it to contain 8.6% of the phosphorus monomer.

The copolymer produced in Example 2 was a tough solid having moderate X-ray crystallinity and an RSV of 20.2 as measured on a 0.1% solution in chloroform at 25° C. Analysis of the copolymer showed that it contained 4.3% of the phosphorus monomer.

The polymer product of Example 1 has utility as a property improver when blended with crystalline and rubbery materials. The polymer product of Example 2 has utility as a water-soluble polymer type thickener, protective colloid, and the like.

EXAMPLES 3–7

These examples illustrate copolymer products of this invention made from cyclic phosphate monomer material and trioxane.

In each of these examples the monomer material used was 95 parts of trioxane and 5 parts of a cyclic phosphate monomer as follows:

Example 3: 2-ethoxy-2-oxo-1,3,2-dioxaphospholane
Example 4: 2-ethoxy-2-oxo-1,3,2-dioxaphosphaindane
Example 5: 2-methoxy-4-methyl-2-oxo-1,3,2-dioxaphospholane
Example 6: 2-(β-chloroethoxy)-4-methyl-2-oxo-1,3,2-dioxaphospholane
Example 7: 2-ethoxy-2-oxo-1,3,2-dioxaphosphahexahydroindane.

The polymerization catalyst used in each of these examples was 0.4 millimole of boron trifluoride (BF$_3$) etherate, added as an 0.8 molar solution in benzene.

In each case the nitrogen filled polymerization vessel was charged with the monomer material and after equilibrating the vessel and contents at the reaction temperature of 65° C., the catalyst solution was injected. The reaction mixture was then agitated at this temperature for 1 hour in Examples 3, 4 and 6, and 3 hours in Examples 5 and 7. In Example 5 there was added during this time 3.8 parts of cyclohexane to reduce the viscosity of the reaction mixture and after 1 hour of the reaction time a second and equal amount of catalyst was added. In Example 7 there was added during the reaction 1.3 parts of cyclohexane to reduce the viscosity of the reaction mixture. At the end of the reaction period, there was added in Examples 3 and 4, 8 parts and in Examples 5–7, 40 parts of anhydrous ethanol.

Separation of polymer product from the reaction mixture obtained in Examples 3 and 4 was accomplished by adding approximately 5 volumes of acetone to the reaction mixture, agitating the reaction mixture in acetone at 50° C. for 16 hours, collecting the insoluble product, washing it twice with hot acetone and once with acetone containing 4,4′ - thiobis(6-5-butyl-m-cresol) at a 0.2% concentration. Thereafter, the washed product was subjected to a 0.4 millimeter of mercury vacuum for 16 hours at 80° C.

In Examples 5–7 the polymer product was separated by adding 80 parts of acetone, collecting the insoluble product and washing it with hot acetone. The products in Examples 6 and 7 were then end-capped with acetate groups by adding 80 parts of acetic anhydride and 0.11 part of sodium acetate per 8 parts of polymer, refluxing the mixture for 1 hour, and after cooling, collecting the insoluble and washing it alternately with water and acetone until neutral. The polymer product of Example 5 and the end-capped polymers of Examples 6 and 7 were each stabilized by slurrying the solid in about 5 volumes of a methanolic solution containing 0.08% of urea and 0.08% of 2,2-methylene-bis(4-methyl-6-tert butylphenol), evaporating the methanol under a stream of nitrogen and then drying under vacuum at 50° C. for 4 hours.

In Example 3, the polymer product was a solid having on X-ray analysis, poly(formaldehyde) crystallinity and had an RSV of 0.17 when measured at 0.1% at 150° C. in dimethylformamide containing 1 gram of diphenylamine per 100 milliliters of solvent. Differential thermal analysis of the product gave a melt range of 110–157° C., a melting point of 157° C. and $\Delta H_f = 35$ calories per gram. The phosphorus comonomer content was 4.0% on the basis of phosphorus analysis.

In Example 4 the polymer product was a solid having on X-ray analysis, poly(formaldehyde) crystallinity, and an RSV of 0.42 when measured at 0.1% at 150° C. in dimethylformamide containing diphenylamine at a concentration of 1 gram per 100 milliliters of solvent. On differential thermal analysis, it had a melt range of 110–160° C., a melting point of 159° C. and $\Delta H_f = 42$ calories per gram. The phosphorus comonomer content was 1.1% based on phosphorus analysis.

The polymer products of these examples have utility as flame resistant materials of construction for shaped articles including unoriented and oriented films and fibers.

In Example 5, the polymer product was a solid having an RSV of 0.10 when measured at 0.1% at 150° C. in dimethylformamide containing 1 gram of diphenylamine per 100 milliliters of solvent. Phosphorus analysis showed it to contain 5.4% of the phosphorus monomer. A film was prepared from the copolymer by pressing at 180° C. under 1500 p.s.i. pressure.

In Example 6, the polymer product was a solid having an RSV of 0.49 when measured at 0.1% at 150° C. in dimethylformamide containing 1 gram of diphenylamine per 100 milliliters of solvent. Phosphorus analysis showed it to contain 1.1% of the phosphorus monomer. A good film was prepared from the copolymer by pressing at 180° C. under 1500 p.s.i. pressure. When coated on aluminum this copolymer had good adherence and much better adherence than was obtained in a control with poly(formaldehyde) (no phosphorus comonomer).

In Example 7, the polymer product was a solid having an RSV of 1.1 when measured at 0.1% at 150° C. in dimethylformamide containing 1 gram of diphenylamine per 100 milliliters of solvent. Phosphorus analysis showed it to contain 0.60% of the phosphorus monomer. A film was prepared from the copolymer by pressing at 180° C. under 1500 p.s.i. pressure.

What I claim and desire to protect by Letters Patent is:

1. A normally solid copolymer of a cyclic phosphate, said copolymer consisting essentially of units of at least one comonomer selected from epoxides and aldehydes and from 0.1 to 50% by weight of the copolymer of structural units having the formula:

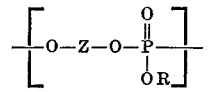

where R is selected from the group consisting of alkyl, cycloalkyl and aryl radicals and these radicals containing as substituents alkyl, cycloalkyl, aryl, halo, haloalky, cyano and cyanoakyl radicals and Z is a radical selected from the group consisting of alkylene, cycloalkylene and arylene radicals.

2. The cyclic phosphate copolymer of claim 1 wherein the comonomer is epichlorohydrin.

3. The cyclic phosphate copolymer of claim 1 wherein the comonomer is ethylene oxide.

4. The cyclic phosphate copolymer of claim 1 wherein the comonomer is trioxane.

5. The copolymer of claim 2 wherein Z is alkylene and R is phenyl.

6. The copolymer of claim 3 wherein Z is alkylene and R is phenyl.

7. The copolymer of claim 4 wherein Z is alkylene and R is alkyl.

8. The copolymer of claim 4 wherein Z is alkylene and R is haloalkyl.

9. The copolymer of claim 4 wherein Z is cyclohexylene and R is alkyl.

10. The copolymer of claim 4 wherein Z is phenylene and R is alkyl.

References Cited
UNITED STATES PATENTS

| | | | |
|---|---|---|---|
| 3,520,849 | 7/1970 | Vandenberg | 260—2 P |
| 2,871,202 | 1/1959 | Scott | 260—2 P |
| 2,616,873 | 11/1952 | Cass | 260—61 |
| 3,298,967 | 1/1967 | Mason | 260—67 |
| 2,964,477 | 12/1960 | Pilat et al. | 260—61 |

SAMUEL H. BLECH, Primary Examiner

U.S. Cl. X.R.

44—62, 76; 117—132 R; 252—49.8, 428, 431 R, 431 N; 260—37 R, 47 P, 67 R, 67 FP, 823, 897 R, 937